US012594496B2

(12) United States Patent
Bean et al.

(10) Patent No.: US 12,594,496 B2
(45) Date of Patent: Apr. 7, 2026

(54) TRANSLATION OF SIGN LANGUAGE IN A VIRTUAL ENVIRONMENT

(71) Applicant: Sony Interactive Entertainment Inc., Tokyo (JP)

(72) Inventors: Celeste Bean, San Francisco, CA (US); Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 309 days.

(21) Appl. No.: 18/296,054

(22) Filed: Apr. 5, 2023

(65) Prior Publication Data

US 2024/0335740 A1     Oct. 10, 2024

(51) Int. Cl.
| | |
|---|---|
| *A63F 13/42* | (2014.01) |
| *A63F 13/213* | (2014.01) |
| *A63F 13/58* | (2014.01) |
| *G06F 3/01* | (2006.01) |
| *G06F 40/58* | (2020.01) |
| *G06T 11/00* | (2006.01) |
| *G06V 20/40* | (2022.01) |
| *G06V 40/20* | (2022.01) |

(52) U.S. Cl.
CPC ............. *A63F 13/42* (2014.09); *A63F 13/213* (2014.09); *A63F 13/58* (2014.09); *G06F 3/017* (2013.01); *G06F 40/58* (2020.01); *G06T 11/00* (2013.01); *G06V 20/40* (2022.01); *G06V 40/28* (2022.01)

(58) Field of Classification Search
CPC ........ A63F 13/42; A63F 13/213; A63F 13/58; A63F 13/85; A63F 13/211; A63F 2300/5553; G09B 21/009
See application file for complete search history.

(56) References Cited

U.S. PATENT DOCUMENTS

| | | | |
|---|---|---|---|
| 7,785,197 B2 | 8/2010 | Smith | |
| 8,523,673 B1 * | 9/2013 | Boyd | .................... A63F 13/215 |
| | | | 463/31 |

(Continued)

FOREIGN PATENT DOCUMENTS

| | | |
|---|---|---|
| CN | 106943740 A | 7/2017 |
| CN | 113557069 A | 10/2021 |

(Continued)

OTHER PUBLICATIONS

PCT/US2024/020551 Notification of Transmittal of the International Search Report and the Written Opinion of the International Searching Authority, or the Declaration, PCT/ISA/220, and the International Search Report, PCT/ISA/210, Jul. 2, 2024.

(Continued)

*Primary Examiner* — David L Lewis
*Assistant Examiner* — Shauna-Kay Hall
(74) *Attorney, Agent, or Firm* — Fish & Richardson P.C.

(57) ABSTRACT

A method is provided, including the following operations: receiving video of a first user; processing the video to identify signed communications in a first sign language made by the first user; translating the signed communications in the first sign language into signed communications in a second sign language; rendering an avatar of the user performing the translated signed communications in the second sign language; presenting the avatar on a display for viewing by a second user.

20 Claims, 6 Drawing Sheets

(56) References Cited

U.S. PATENT DOCUMENTS

| | | | |
|---|---|---|---|
| 8,751,215 B2* | 6/2014 | Tardif .................... G06F 3/017 704/4 |
| 9,684,430 B1 | 6/2017 | Perigault |
| 10,179,291 B2 | 1/2019 | Thomas et al. |
| 10,915,178 B2 | 2/2021 | Iwanami |
| 10,946,280 B2 | 3/2021 | Kunieda |
| 11,126,266 B1 | 9/2021 | Xiao et al. |
| 11,369,884 B2 | 6/2022 | Niwa et al. |
| 11,402,917 B2 | 8/2022 | Yokokawa |
| 12,131,586 B2 | 10/2024 | Carlock et al. |
| 2002/0178011 A1 | 11/2002 | Yotoriyama et al. |
| 2007/0191097 A1 | 8/2007 | Johnson |
| 2009/0217211 A1 | 8/2009 | Hildreth et al. |
| 2010/0112530 A1* | 5/2010 | Schoenbach .......... H04N 7/147 434/116 |
| 2010/0199228 A1 | 8/2010 | Latta et al. |
| 2011/0059801 A1 | 3/2011 | Shigi et al. |
| 2011/0301934 A1 | 12/2011 | Tardif |
| 2012/0054646 A1 | 3/2012 | Hoomani et al. |
| 2013/0084978 A1 | 4/2013 | Olomskiy |
| 2014/0046661 A1* | 2/2014 | Bruner .............. H04N 21/6582 704/235 |
| 2014/0329208 A1* | 11/2014 | Jones ................... G09B 21/009 434/169 |
| 2016/0005336 A1 | 1/2016 | Peng et al. |
| 2016/0042228 A1 | 2/2016 | Opalka et al. |
| 2016/0059120 A1 | 3/2016 | Komorous-King et al. |
| 2017/0173455 A1* | 6/2017 | Sheil ....................... A63F 13/69 |
| 2018/0075659 A1 | 3/2018 | Browy et al. |
| 2018/0161683 A1 | 6/2018 | Thomas et al. |
| 2018/0260577 A1 | 9/2018 | Adams et al. |
| 2018/0345128 A1 | 12/2018 | Ahmed et al. |
| 2019/0038964 A1 | 2/2019 | Veeramani et al. |
| 2019/0171716 A1 | 6/2019 | Weber |
| 2019/0251344 A1* | 8/2019 | Menefee ................. G06F 3/017 |
| 2019/0340426 A1 | 11/2019 | Rangarajan et al. |
| 2019/0391662 A1 | 12/2019 | Yokokawa |
| 2020/0193714 A1 | 6/2020 | Browy et al. |
| 2020/0276497 A1 | 9/2020 | Nietfeld et al. |
| 2020/0298131 A1 | 9/2020 | Pinto et al. |
| 2020/0380793 A1 | 12/2020 | Browy et al. |
| 2021/0146255 A1* | 5/2021 | Taylor .................. G06V 40/171 |
| 2021/0390289 A1* | 12/2021 | Yang ...................... G06V 10/82 |
| 2022/0096937 A1 | 3/2022 | Dorn et al. |
| 2022/0165013 A1 | 5/2022 | Velez et al. |
| 2022/0171960 A1 | 6/2022 | Nelson et al. |
| 2022/0188538 A1 | 6/2022 | Vieira et al. |
| 2022/0327309 A1 | 10/2022 | Carlock et al. |
| 2022/0343576 A1 | 10/2022 | Marcy et al. |
| 2022/0362680 A1 | 11/2022 | Stafford et al. |
| 2023/0087879 A1 | 3/2023 | An et al. |
| 2024/0335737 A1 | 10/2024 | Bean et al. |
| 2024/0367034 A1 | 11/2024 | Tokubo et al. |
| 2024/0367055 A1 | 11/2024 | Black et al. |
| 2024/0375011 A1 | 11/2024 | Black et al. |

FOREIGN PATENT DOCUMENTS

| | | | |
|---|---|---|---|
| EP | 3979050 A1 | 4/2022 |
| JP | 2011-212296 A | 10/2011 |
| JP | 2013-135761 A | 7/2013 |
| JP | 2020-031903 A | 3/2020 |
| JP | 2020-065656 A | 4/2020 |
| JP | 2020-513960 A | 5/2020 |
| JP | 2020-177438 A | 10/2020 |
| JP | 2022-522402 A | 4/2022 |
| KR | 102304608 B1 | 9/2021 |
| WO | WO 2017081896 A1 | 5/2017 |
| WO | WO 2020176106 A1 | 9/2020 |

OTHER PUBLICATIONS

Usma et al. "Advances in machine translation for sign language: approaches, limitations, and challenges", Neural Computing, London, vol. 33, No. 21, May 18, 2021, pp. 14357-14399, XP037599282, ISSN: 0941-0643, DOI: 10.1007/S00521-021-06079-3.

Wikipedia.org [online], "Emote," Jan. 11, 2023, retrieved on Mar. 19, 2025, retrieved from URL<https://en.wikipedia.Org/w/index. php?title=Emote&oldid=1132929070>, 2 pages.

* cited by examiner

TRANSLATION OF SIGN LANGUAGE IN A VIRTUAL ENVIRONMENT

BACKGROUND OF THE INVENTION

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

It is in this context that implementations of the disclosure arise.

SUMMARY OF THE INVENTION

Implementations of the present disclosure include methods, systems and devices for translation of sign language in a virtual environment.

In some implementations, a method is provided, including the following operations: receiving video of a first user; processing the video to identify signed communications in a first sign language made by the first user; translating the signed communications in the first sign language into signed communications in a second sign language; rendering an avatar of the user performing the translated signed communications in the second sign language; presenting the avatar on a display for viewing by a second user.

In some implementations, the translating includes translating the signed communication in the first sign language into text in a first written language.

In some implementations, the translating further includes translating the text in the first written language into text in a second written language, and translating the text in the second written language into the signed communications in the second sign language.

In some implementations, the avatar is rendered in a virtual environment, and wherein presenting the avatar includes presenting a view of the virtual environment on the display.

In some implementations, the virtual environment is defined for gameplay of a video game.

In some implementations, the method enables substantial real-time communication between the first user and the second user.

In some implementations, processing the video further identifies non-signing gestures made by the first user; wherein when the non-signing gestures are made, then the avatar is rendered performing the non-signing gestures in a substantially similar manner to the first user, and when the signed communications in the first sign language are made, then the avatar is rendered performing the translated signed communications in the second sign language.

In some implementations, a non-transitory computer-readable medium is provided having program instructions embodied thereon that, when executed by at least one computing device, cause said at least one computing device to perform a method, said method including: receiving video of a first user; processing the video to identify signed communications in a first sign language made by the first user; translating the signed communications in the first sign language into signed communications in a second sign language; rendering an avatar of the user performing the translated signed communications in the second sign language; presenting the avatar on a display for viewing by a second user.

In some implementations, a system is provided including at least one computing device, said at least one computing device having logic configured to implement a method, said method including: receiving video of a first user; processing the video to identify signed communications in a first sign language made by the first user; translating the signed communications in the first sign language into signed communications in a second sign language; rendering an avatar of the user performing the translated signed communications in the second sign language; presenting the avatar on a display for viewing by a second user.

Other aspects and advantages of the disclosure will become apparent from the following detailed description, taken in conjunction with the accompanying drawings, illustrating by way of example the principles of the disclosure.

BRIEF DESCRIPTION OF DRAWINGS

The disclosure may be better understood by reference to the following description taken in conjunction with the accompanying drawings in which.

DETAILED DESCRIPTION OF THE INVENTION

Implementations of the present disclosure relate to methods and systems for capturing sign language of one user (e.g., Japanese), and translating the sign language to another user (e.g., English). Because sign languages vary depending on geographical origins, sign language is not universal. This provides a need for appropriately capturing the sign language of one user, understanding the native language, and generating new sign language as output for another user in their native sign language. In one embodiment, sign language from one language is first captured and translated to text. Once in text form, a language translation is performed (e.g. Japanese to English), and then sign language is generated in the form of graphical illustrations. The graphical illustrations can include a pair of hands of an avatar, or an avatar with a face and arms performing the sign gestures. In some embodiments, a method is executed to fine-tune the output of a first sign language to remove extraneous words or remove native regional signs. The fine-tuning can be targeted, such that tuning can use templates depending on the translation direction and the input sign language and output sign language focus. For example, one template can be for signing between Japanese and English, and a different template can be used for signing between English and Japanese.

Figure 1:
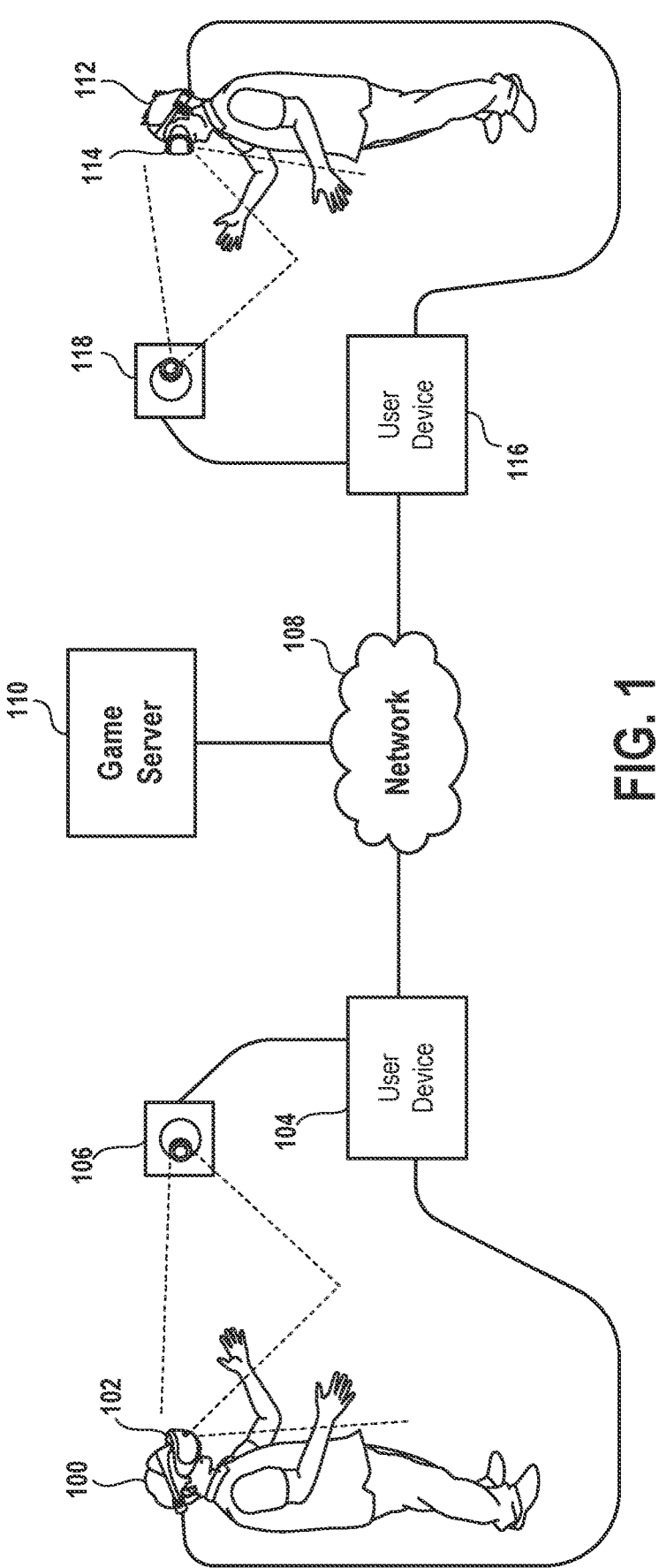
FIG. 1 conceptually illustrates two users that are remotely situated interacting using sign language, in accordance with implementations of the disclosure.

FIG. 1 conceptually illustrates two users that are remotely situated interacting using sign language, in accordance with implementations of the disclosure.

In the illustrated implementation, a user 100 is interacting with another user 112 in a virtual environment, such as a virtual space of a video game or social platform. It will be appreciated that with the rise of online gaming, players participating in a game could theoretically be located any-where in the world, and may not share the same language or culture. Accordingly, players communicating via sign lan-guage may not use or understand the same sign language, just as players that communicate via spoken/written lan-guage might not share the same spoken/written language. And thus, it is useful to provide translation between sign languages so that players may understand each other.

In the illustrated implementation, the user 100 views the virtual environment through a head-mounted display (HMD) 102 (sometimes called a virtual reality (VR) head-set). In some implementations, the HMD 102 connects via a wired or wireless connection to a user device 104, such as a personal computer, game console, or other computing device. In some implementations, the user device 104 ren-ders graphics for display through the HMD 102 that provide immersive viewing of the virtual environment for the user 100. In some implementations, the HMD 102 includes some or all of the functionality of the user device 104. The user 112 likewise views the virtual environment through a HMD 114, which in some implementations, is connected to a user device 116.

The user device 104 and user device 116 communicate over a network 108 with a game server 110. In some implementations, the game server 110 executes a shared session of a video game, maintaining the canonical state of the video game and its virtual environment, and to which the user devices 104 and 116 are synchronized regarding the state of the virtual environment. In this manner, the user 100 and user 112 can share and interact with each other in the same virtual environment. In some implementations, the game server 110 is part of a cloud gaming system, which renders and streams video to the user device 104 and user device 116.

User 100 and user 112 may be represented by correspond-ing avatars in the virtual environment. And as the users 100 and 112 engage in interactivity in the virtual environment, their avatars can be configured to mimic their movements. However, if the users 100 and 112 communicate using different preferred sign languages, then their communication can be translated from one sign language to the other and vice versa. For example, user 100 may communicate using a first sign language, but user 100's avatar in the virtual environment will be configured to appear to the second user 112 to make gestures in a second sign language that is the preferred sign language of the user 112. Similarly, user 112 may communicate using the second sign language, but user 112's avatar in the virtual environment will be configured to appear to the user 100 to make gestures in the first sign language that is the preferred sign language of the user 100. For example, user 100 may sign in American Sign Language (ASL), whereas user 112 signs in Japanese Sign Language (JSL). When user 100 performs gestures in ASL, these gestures are translated into JSL, and the user 100's avatar is rendered and portrayed to the user 112 as performing the translated gestures in JSL. And when user 112 performs gestures in JSL, these gestures are translated into ASL, and the user 112's avatar is rendered and portrayed to the user 100 as performing the translated gestures in ASL.

In some implementations, the HMD 102 includes one or more externally facing cameras capable of capturing video of the user 100's hands (and at least a portion of the user 100's arms). In some implementations, an additional exter-nal camera 106 captures video of the user 100 in their local environment, which can include the user 100's hands and arms, as well as the rest of the user's body (e.g. head, body, legs). Likewise, the HMD 114 can include one or more externally facing cameras capable of capturing video of the user 112's hands. And an external camera 118 can capture video of the user 112 in their local environment. In some implementations, each of the HMD's and/or external cam-eras may further include one or more microphones that capture audio of the respective users.

In accordance with implementations of the disclosure, the captured video and audio of a given user is analyzed to identify or determine the content of the signed communica-tion of that user in a first sign language, and the signed communication is then translated into a second sign lan-guage that is rendered to the other user. The translated sign language is rendered through an avatar associated with the user so that the avatar appears to the other user to be signing in the second sign language.

It will be appreciated that the system is capable of detecting when a given user is performing a communicative gesture that should be translated, as opposed to performing a gesture that should not be translated. For example, the user might be making non-communicative gestures to interact with an object in the virtual environment, and such gestures should be faithfully rendered and performed by their avatar. Whereas when the user is communicating with another user using sign language, then their signed communication is translated. Thus in some implementations, the system deter-mines, based on the context of gestures made by the user, whether such gestures are intended to be sign language gestures that should be translated. Examples of such context can include, where the user is looking (gaze direction) or what the user is looking at in the virtual environment (e.g. when the user is looking at another user's avatar, it is more likely they will sign), proximity of the user to another user in the virtual environment, whether another user is looking at the given user (as determined from the other user's gaze direction), proximity of the user avatar's hands to an object in the virtual environment, movement of the user avatar in the virtual environment, whether there are accompanying sounds being spoken by the user, gameplay-related activity or gameplay actions of the user, etc. It will be appreciated that by determining when a user is making sign language gestures requiring translation, recognition and translation of gestures can be selectively applied to those situations when the user is actively signing, and accidental translation of gestures that should not be translated is avoided. Further-more, processing resources are conserved, as attempts to recognize and translate gestures are not made in contexts where the user is not likely to engage in signing.

While two users are shown in the illustrated implemen-tation, it will be appreciated that the concepts can be extended to more than two users and and more than two sign languages. For example, when a first user is communicating with a second user, the first user's communicative gestures in a first sign language can be translated into a second sign language for the second user. And when the first user is communicating with a third user, the first user's communicative gestures in the first sign language can be translated into a third sign language for the third user. In some implementations, translation into multiple sign languages can occur simultaneously, such as when a user is addressing multiple other users. For example, when the first user is simultaneously communicating with the second and third users, the first user's communicative gestures in the first sign language can be simultaneously translated and rendered into the second and third sign languages for the second and third users, respectively. It will be appreciated that in such instances, the first user's avatar will appear differently to the second user and the third user, as the first user's avatar will appear to the second user to be signing in the second sign language, while the first user's avatar simultaneously appears to the third user to be signing in the third sign language.

While implementations of the present disclosure are generally described in the context of video games, it will be appreciated that in other implementations, the principles of the present disclosure can be applied to other contexts in which communication via sign language may occur, including other types of interactive applications (e.g. social networking applications, video communications, other interactive virtual environments, virtual reality and augmented reality environments, etc.

While an implementation using HMDs has been described, it will be appreciated that in other implementations, the users may interact using other types of displays and devices, such a television, monitor, laptop, mobile device, etc. In some implementations, a user may have a communicative avatar that does not interact in the virtual environment of the video game, but is displayed for other users and configured to render sign language that has been translated into the preferred sign language of the viewer, in accordance with the principles of the present disclosure.

Figure 2:
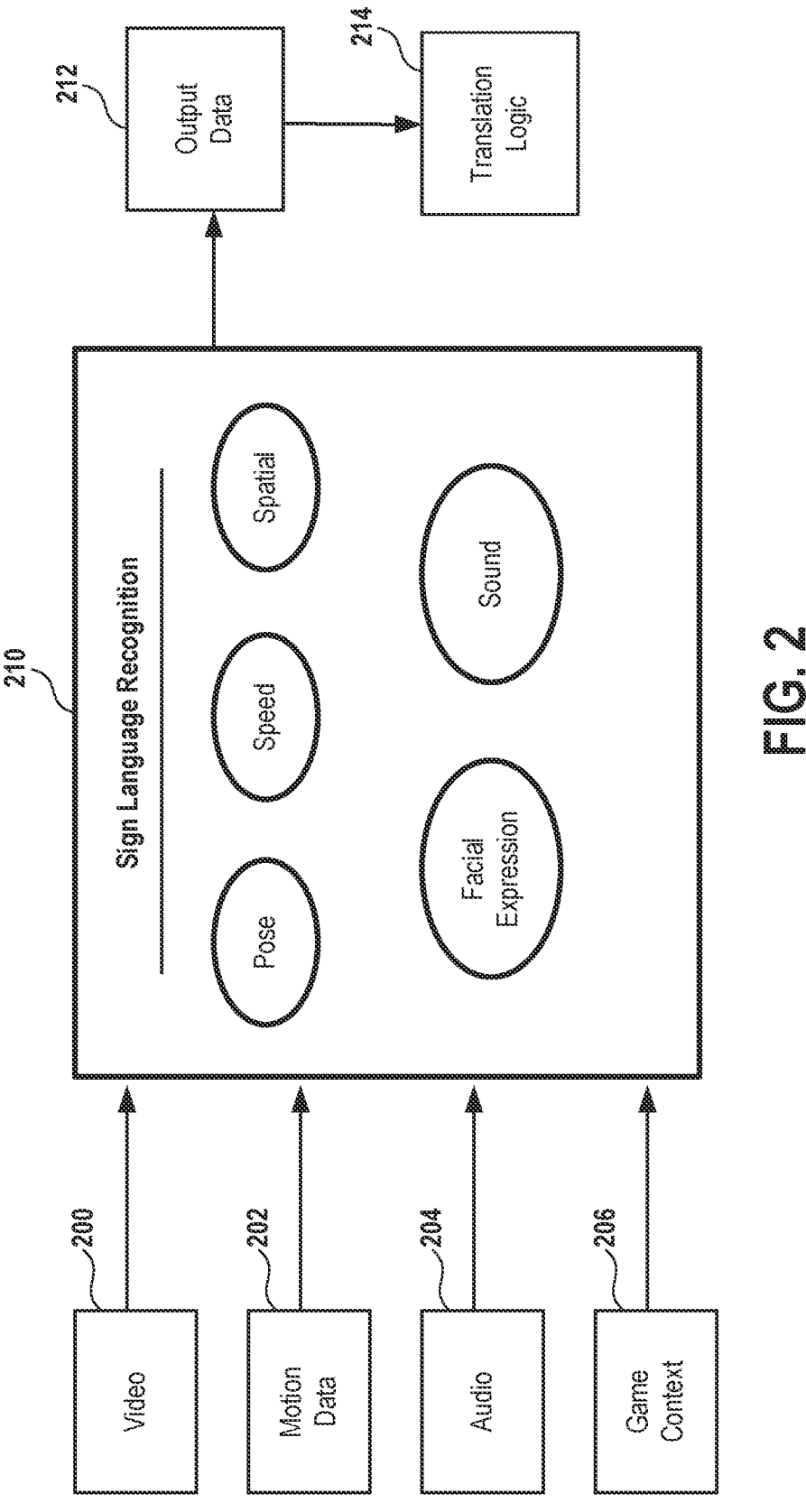
FIG. 2 conceptually illustrates a sign language recognition logic and various inputs used by the sign language recognition logic, in accordance with implementations of the disclosure.

FIG. 2 conceptually illustrates a sign language recognition logic and various inputs used by the sign language recognition logic, in accordance with implementations of the disclosure.

In the illustrated implementation, a sign language recognition logic 210 is implemented, to determine when a given user is making communicative gestures, and if so, then determine the content or semantic meaning of the communicative gestures such as by recognizing the gestures in accordance with a particular sign language. It will be appreciated that a variety of inputs can be utilized by the sign language recognition logic 210.

Video 200 of the user can include captured videos such as that described above. By way of example, video 200 can include captured video of the user's hands and arms, as well as captured video of other parts of the user's body or the user as a whole. For example, captured video of the user's head and face, or portions thereof, can show facial expressions and head movements. In some implementations, an HMD as described herein may include one or more internally facing cameras to capture video of the user's eyes, and/or one or more cameras positioned and configured to capture video of the user's mouth and/or nose, or portions thereof. In some implementations, an external camera captures video of some or all of the user. In some implementations, one or more depth cameras can be used to provide three-dimensional depth information.

Motion data 202 includes data from one or more motion sensors (e.g. accelerometer, gyroscope, etc.) capturing movements of the user. For example, the HMD may include motion sensors capturing the pose and movements of the user's head. Or in some implementations, the user may wear motion sensing gloves or other peripheral attachments capable of capturing the movements and positioning of the user's hands.

Audio 204 includes captured sound generated by the user, and may be recorded by one or more microphones as previously described.

Game context 206 includes data describing the contextual settings and actions in which a user's gestures may occur. For example, this can include data describing where/what the user's gaze is directed towards in the virtual environment, the location of the user in the virtual environment, proximity of the user to objects or users in the virtual environment, other user's gaze directions in the virtual environment, proximity of the user avatar's hands to an object in the virtual environment, movements of the user avatar in the virtual environment, gameplay-related activity or gameplay actions of the user, gameplay content being rendered, stage/level of the game, amount of activity occurring in the game and proximity of the activity to the user, etc.

As noted, in some implementations, the recognition logic 210 is configured to determine whether the user is actually attempting to make a communicative sign language gesture. For in the context of a virtual environment such as that of a video game, the user may make many kinds of gestures, not all of which are intended to be sign language communications, and accordingly, the system should not attempt to translate all such gestures, but only those that are actually communicative gestures needing translation. Otherwise, the system risks changing the appearance of the user avatar's gestures in instances when they ought not to be changed, which may cause miscommunication between users to occur, and further wastes processing resources.

Accordingly, it will be appreciated that the game context 206 is a significant source of data influencing whether a user is likely to be attempting to communicate via sign language or not. Several examples of features of the game context 206 can be analyzed and used to help determine whether a user is attempting to communicate via sign language. For example, the gaze direction of the user can be analyzed to determine what the user is looking at, and this may make it more or less likely that the user is signing. For example, when the user is looking at one or more other users, then it is more likely that the user is attempting to use sign language, whereas if the user is looking at an object that is not a user, then this may make it less likely that the user is signing. Similarly, the gaze direction of other users can also be analyzed to determine whether they are looking at the given user, and if so, this may also increase the likelihood that the user is attempting to sign. In some implementations, the proximity of the user to another user in the virtual environment is a factor, such that the more distant the user is located from any other users, then the less likely it becomes that the user would be attempting to sign.

In some implementations, the interactivity of the user in the virtual environment is a factor, such that the particular activity that the user is engaged in may make it more or less likely that the user is attempting to sign. For example, if the user (or their avatar) is engaged in a high intensity or high speed activity such as running or moving quickly in the virtual environment, then such activity may be considered to make it less likely that the user is signing. Whereas if the user is engaged in a low intensity or low speed activity such as standing in place or being seated, this may be considered to make it more likely that the user is signing. As another example, if the user is interacting with an object in the virtual environment (e.g. touching, grasping, holding, manipulating, pushing, pulling, etc.), this may make it less likely that the user is signing.

In some implementations, the particular stage, section, scene, level, setting, location, etc. of the game in which the user is engaged in gameplay, can be considered as a factor influencing the likelihood that the user is signing. For example, when the user is located in a restaurant setting of the game, the user may be more likely to sign than when the user is located in a cockpit setting. In some implementations, the activity occurring in the vicinity of the user in the virtual environment, as well as the proximity of the user to such activity, can influence the likelihood that the user is signing. For example, when the user is proximate to high intensity activity such as live combat activity, the user may be less likely to sign than when the user is proximate to low intensity activity such as users who are walking or stationary. As another example, the user's proximity to other users that are engaged in communication may increase the likelihood of signing.

When the user is attempting to sign, the sign language recognition logic 210 is configured to identify the signed communication and further determine its semantic meaning. More specifically, the sign language recognition logic 210 is capable of determining a more accurate semantic understanding of the signed communication than simply identifying the signs used in accordance with the appropriate sign language being utilized by the user. This is accomplished by incorporating and utilizing information beyond the recognized poses and motions of the sign language.

In some implementations, spatial aspects of the signed gestures are analyzed and used to determine the semantic meaning of the signed gestures. Aspects such as the magnitude of movements, the size of the volume of space being used to make the signed gestures, the speed of the arm/hand movements, the cadence/tempo/rhythm of such movements, etc. can be determined by analyzing the video 200 and/or motion data 202. And such aspects can provide further information to help determine the semantic meaning of the signed gestures. For example, gestures made using greater volume of space or with faster speed may be interpreted as being made with greater emphasis or intensity or excitement than gestures made using less volume of space or with slower speed.

In some implementations, additional motions of the user are analyzed, such as movements of the user's head, body, legs, etc. Such motions can be determined from analyzing the video 200 and/or motion data 202, and may provide information to help determine the semantic meaning of the signed gestures.

In some implementations, facial expressions of the user while signing are identified from the video 200, and used to help determine semantic meaning. Facial expressions are typically an important part of a sign language, affecting meaning in various ways such as by communicating grammar, syntax, and emotion. Hence, facial expression recognition is an important part of the recognition of signed communication. It will be appreciated that facial expressions in the context of a signed communication are recognized as being part of the signed communication, and are distinguished from other facial expressions which may occur during other times when the user is not actively signing. Furthermore, because facial expressions are used in different sign languages in different ways according to their respective conventions, it will be appreciated that when a user's signed communication is translated to another sign language, the rendering of their avatar communicating in the other sign language can include different facial expressions according to that sign language. Thus, while the user is signing, their avatar is rendered with facial expressions that differ from the user's actual facial expressions, whereas at other times when the user is not signing, their avatar is rendered with facial expressions matching the user's actual facial expressions.

In some implementations, sounds of the user are analyzed from the audio 204, and used to help determine semantic meaning. For example, while signing the user may make vocal sounds or utterances correlated to the poses and movements of the sign language which the user is signing. These are recorded as audio 204, and analyzed to determine additional semantic meaning in the signed communication, such as emphasis, accentuation, tone, inflection, emotion, etc.

In some implementations, the game context 206 is used to determine the meaning and content of the user's signed communication. Aspects of the user's game context 206 such as what activity the user is engaged in performing, where the user is located in the virtual environment of the game, what stage of the game has been reached, what the user is attempting to achieve in the context of the game, etc., can be factors influencing the likelihood that the user is making particular signs. Thus, the identification of what the user is signing can be performed more accurately by considering the game context 206 in which the user's signed communication is occurring.

The result of applying the sign language recognition logic 210 is output data 212 which identifies the content and semantic meaning of signed communications by the user. In some implementations, the output data 212 is in the form of text in a written language. In some implementations, the written language is that corresponding to the locale of the sign language. For example, for a user signing in ASL, the sign language recognition logic 210 may output text in written American English. In some implementations, the text can include data describing font adjustments such as bold, underline, italicization, etc. In some implementations, the written text can include non-standardized characters, symbols, emojis, etc.

In other implementations, the output data 212 is in the form of data which describes the identified signs in the sign language utilized by the user. It will be appreciated that such data may in fact utilize a written language, but will be configured to specifically define a literal identification of the signed communication, rather than constituting a written prose or text according to the regular conventions (grammatical and otherwise) of the written language.

In some implementations, the output data 212 is further processed by translation logic 214 which translates the output data 212 into signed communications in another sign language, which can be rendered by an avatar as described herein. In some implementations, the translation logic 214 generates data describing signs in the other sign language, which represent a translation of the original signed communication. The data generated by the translation logic 214 is used in some implementations to cause an avatar to perform the signed communications identified by the data. In some implementations, the translation logic 214 employs an ML model to perform the translation, such as a model to translate from text to sign language, or from one sign language to another sign language.

In still other implementations, the output data 212 can be in the form of data identifying signs in another sign language. In such implementations, the recognition logic 210 is also configured to directly translate from one sign language to another sign language.

In some implementations, the recognition logic 210 employs one or more models to perform the recognition (and optionally, translation) of the user's signed communication and generate the output data 212. In some implementations, the recognition logic 210 includes logic for processing the video 200, motion data 202, audio 204, and/or game context 206, to extract features which are then used by a given model. In some implementations, a given recognition/translation model is more specifically a trained machine learning (ML) model.

Figure 3:
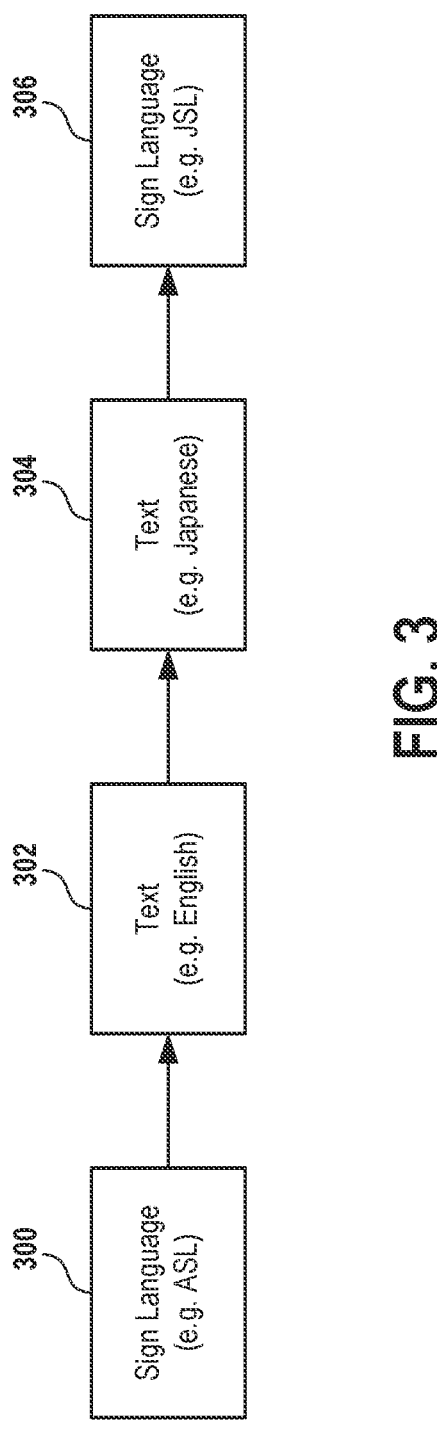
FIG. 3 conceptually illustrates a process for translating one sign language to another sign language, in accordance with implementations of the disclosure.

FIG. 3 conceptually illustrates a process for translating one sign language to another sign language, in accordance with implementations of the disclosure.

In the illustrated process, a user's signed communication 300 in a first sign language, is recognized and translated into a first written text 302 in a first written language. The first written language may be the corresponding written language of the locale of the first sign language.

Then, the first written text 302 is translated into a second written text 304. The second written text 304 is in a second written language that may be the corresponding written language of a locale of a second sign language.

Then, the second written text 304 is translated into signed communication 306 in the second sign language.

In this manner, the user's original signed communication 300 in the first sign language is translated into the signed communication 306 in the second sign language. It will be appreciated that the signed communication 300 and signed communication 306 can be in the form of data identifying sign language poses and movements in the respective sign languages.

It will be appreciated that the signed communication 306 can be performed by the user's avatar in a virtual environment, for viewing by another user, as has been described.

While translation from a first sign language to a second sign language is described in implementations of the present disclosure, it will be appreciated that in addition to signs that are part of a formal sign language, other informal communicative gestures can be translated from one culture/nationality to another. It will be appreciated that some gestures may have a certain meaning in one culture, but a different meaning in another culture. For example, the thumbs-up gesture is generally a positive gesture in American culture, but can be a pejorative gesture in other cultures. Accordingly, it is important to translate gestures when their meaning is not consistent from one culture to another.

Figure 4:
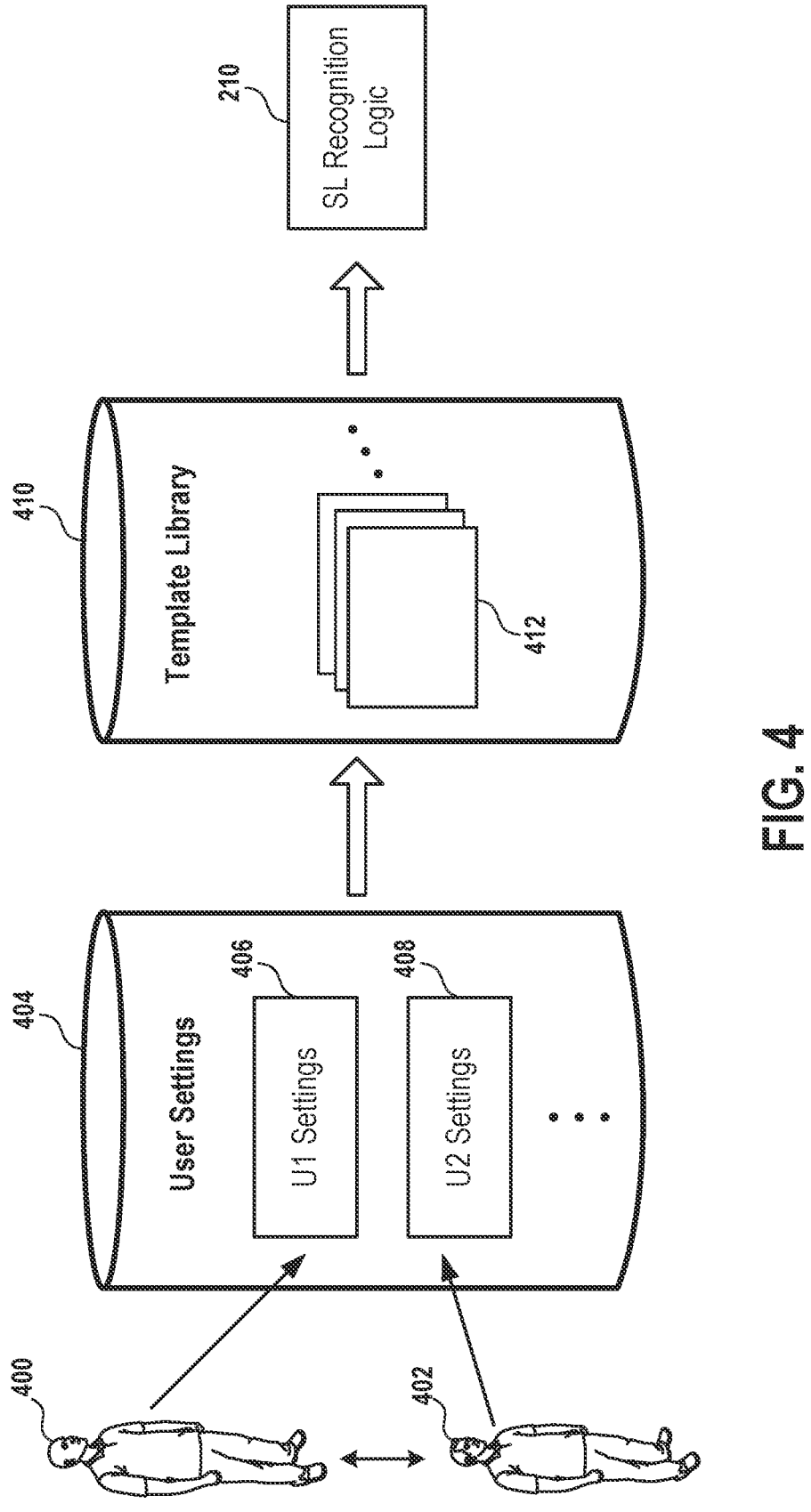
FIG. 4 conceptually illustrates application of templates for translating signed communications from one sign language to another, in accordance with implementations of the disclosure.

FIG. 4 conceptually illustrates application of templates for translating signed communications from one sign language to another, in accordance with implementations of the disclosure.

In some implementations, templates are used by the recognition logic 210 to enable translation from a first sign language to a second sign language. In the illustrated implementation, a first user 400 and second user 402 communicate with each other. User settings 404 for the users include settings 406 for the first user 400, and settings 408 for the second user 402. These settings include a preferred sign language for each user. For example, the preferred sign language of user 400 may be ASL, while the preferred sign language of user 402 may be JSL. A template library 410 includes various templates 412 which can be configured to enable translation and/or refine/tailor translation in accordance with various implementations of the disclosure.

In some implementations, templates are defined to enable the translation from one sign language to another. For example, in the illustrated implementation, for user 400's signed communications, a given template is selected and used by the recognition logic based on the aforementioned user settings to enable translation from ASL to JSL. Whereas for user 402's signed communications, another template is selected and used by the recognition logic based on the aforementioned user settings to enable translation from JSL to ASL.

In some implementations, templates enable fine-tuning according to various aspects impacting recognition and translation. For example, in some implementations, templates can be user-specific, defining parameters for tuning recognition/translation models for more accurate recognition/translation of a given user's signed communications. It will be appreciated that the manner in which a user makes sign language gestures is specific to the user, and accordingly a template can be configured for the user to tune model parameters to better recognize and/or translate the user's gestures. In this way, a model can be tailored or adjusted for aspects such as the individualized poses and range of movements employed by the specific user.

In some implementations, templates can be game-specific, defining parameters for tuning recognition/translation models for more accurate recognition/translation based on the context of the video game. For example, certain gestures may be more or less common in a given video game, and a model's detection of such gestures can be adjusted accordingly. There can be different templates for different stages of the video game, as the settings and activities at different stages of the video game can change and affect the likelihood of particular signed communications being made.

In some implementations, a template (or setting or parameter) is customizable by the user to adjust the tone of the translation of their signed communication. For example, a user might configure a template for use when communicating with teammates that translates their signed communication using a more friendly, amicable, or respectful tone. Whereas the user might configure a template for use when communicating with opponents that translates their signed communication using a more aggressive, adversarial, or disrespectful tone. It will be appreciated that a template can be customizable to control translation across multiple dimensions of tone, such as happy versus sad, friendly versus adversarial, intense versus relaxed, strong versus weak, serious versus lighthearted, etc.

Accordingly, a user can customize how their signed communication is adjusted when translated. There can be various templates defined for different games or different contexts within a given game.

Figure 5:
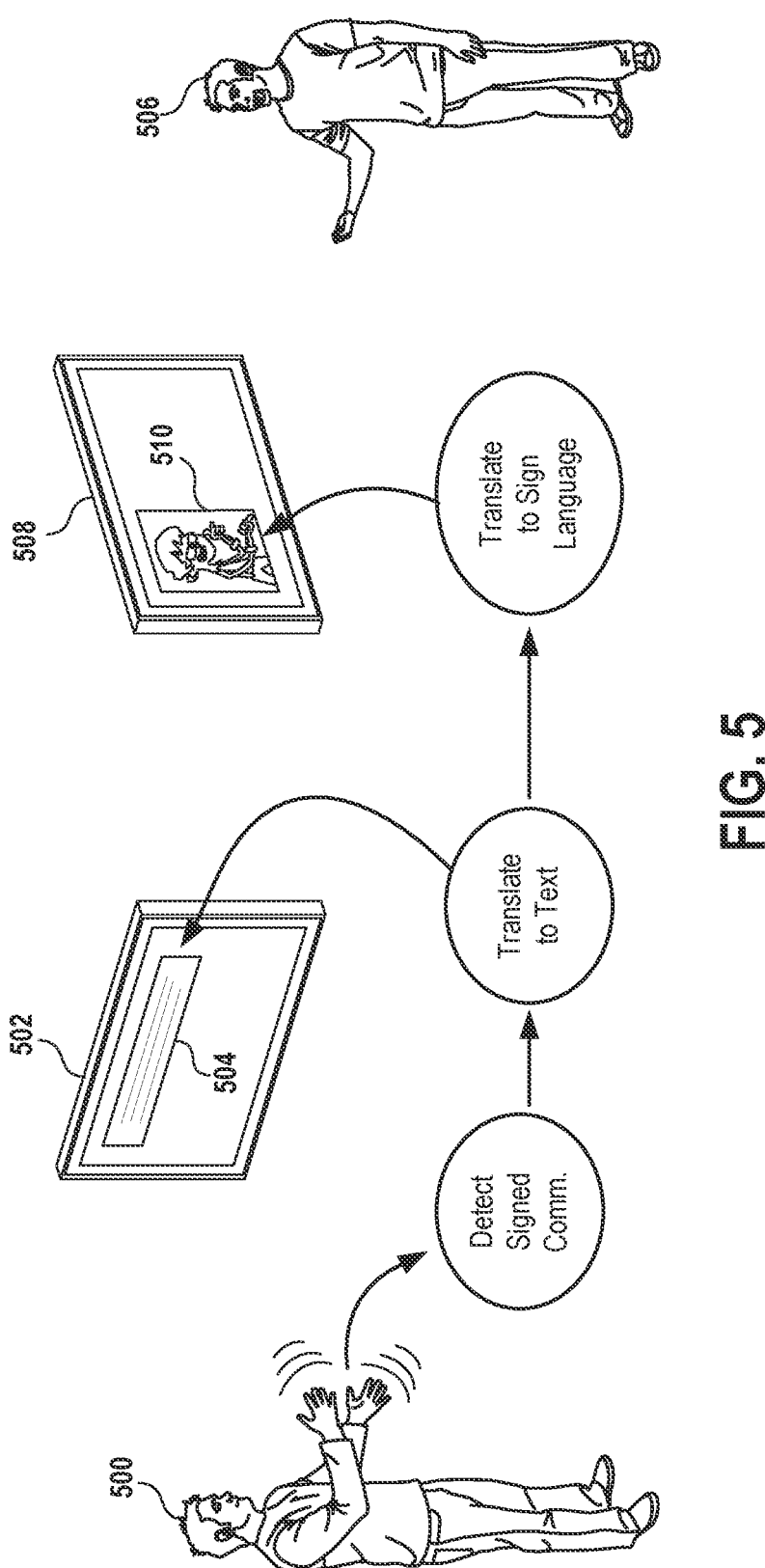
FIG. 5 conceptually illustrates a system providing feedback to a user regarding recognition of their signed communication, in accordance with implementations of the disclosure.

FIG. 5 conceptually illustrates a system providing feedback to a user regarding recognition of their signed communication, in accordance with implementations of the disclosure.

It will be appreciated that as a user's signed communication is processed in accordance with implementations of the disclosure, recognition of the signed communication, and translation, may or may not be satisfactory to the user. Thus, a mechanism is implemented for providing feedback to the user regarding how the system has understood their signed communication. In some implementations, the signed communication of a first user 500 is detected and translated into written text. The written text 504 can be presented on the display 502 which the user 500 is viewing, thereby providing the user with feedback regarding how their signed communication is understood by the system.

In some implementations, mechanisms are provided for the user 500 to respond to the written text 504. For example, the user 500 may confirm that they are satisfied with the text translation of their signed communication by performing some predefined gesture, such as a specific signed word or other communicative gesture such as nodding their head, thumbs up, etc. In some implementations, if the user 500 is not satisfied with the text translation, the user 500 may edit the text translation by providing input through another mechanism such as using a keyboard. In some implementations, multiple possible text translations of the user's signed communication are presented, and the user may select (e.g. using gestures, signs, or an input device) the one which most closely matches their intended meaning. In this manner, the user is able to provide feedback to the system regarding the quality of the system's understanding of the user's signed communication.

In some implementations, such feedback is used to refine and further train the models used to recognize and/or translate the user's signed communications, or adjust settings, parameters, or templates impacting the use of such models.

In the illustrated implementation, the user's signed communication is translated into another sign language, and presented through an avatar 510 on a display 508 for viewing by another user 506.

Figure 6:
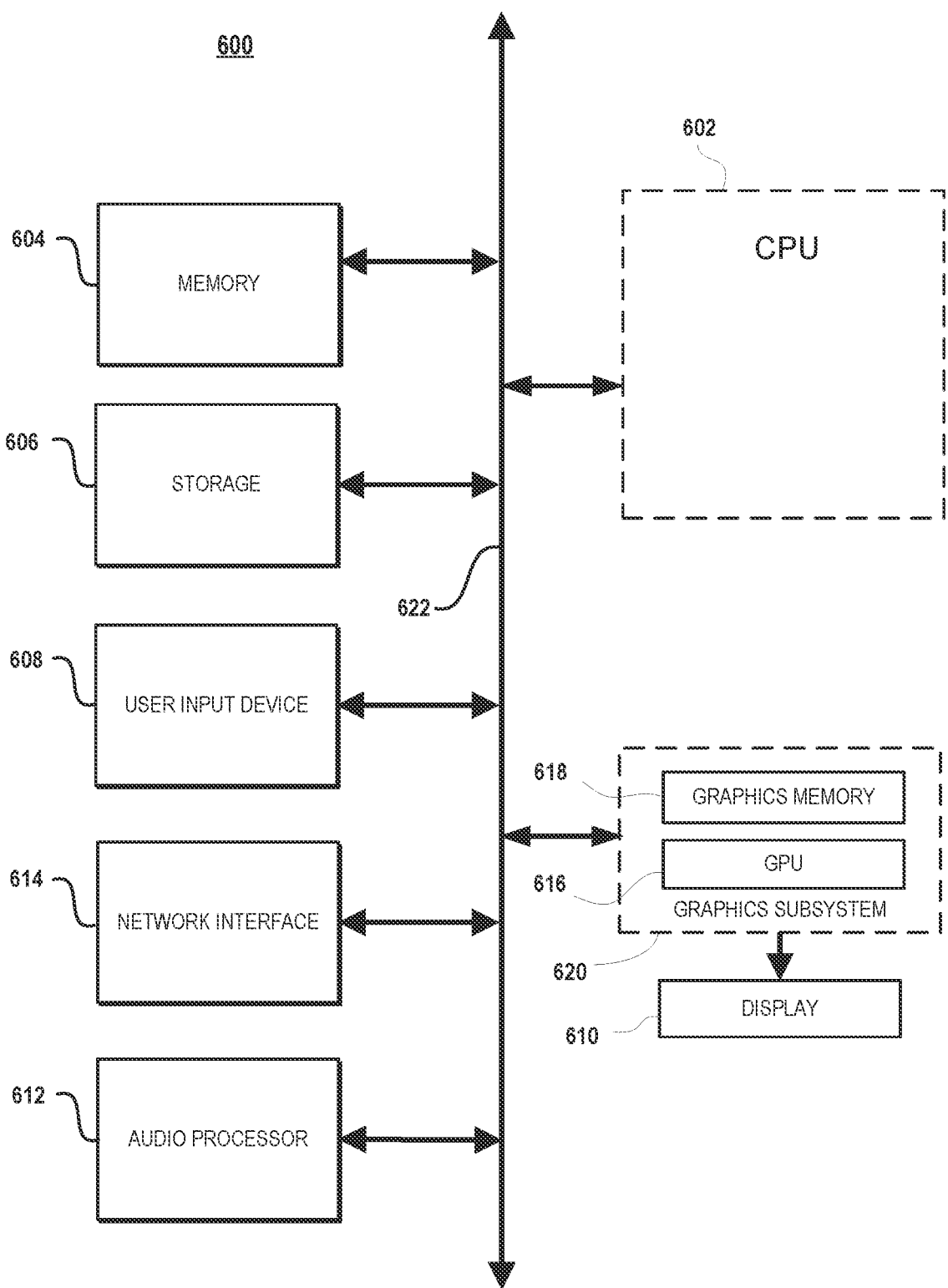
FIG. 6 illustrates components of an example device 600 that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory

604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (Saas). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method, comprising:
receiving video of a first user of a video game;
processing the video to identify gestures made by the first user while the first user plays the video game;
receiving context data indicating actions occurring in the video game when the gestures are made by the first user;
determining, using the context data, whether the gestures made by the first user include signed communications in a first sign language;
in response to determining that the gestures made by the first user include signed communications in the first sign language, translating the signed communications in the first sign language into signed communications in a second sign language;
rendering an avatar of the first user performing the translated signed communications in the second sign language; and
presenting the avatar on a display for viewing by a second user.

2. The computer-implemented method of claim 1, wherein the translating includes translating the signed communication in the first sign language into text in a first written language.

3. The computer-implemented method of claim 2, wherein the translating further includes translating the text in the first written language into text in a second written language, and translating the text in the second written language into the signed communications in the second sign language.

4. The computer-implemented method of claim 1, wherein the avatar is rendered in a virtual environment, and wherein presenting the avatar includes presenting a view of the virtual environment on the display.

5. The computer-implemented method of claim 4, wherein the virtual environment is defined for gameplay of the video game.

6. The computer-implemented method of claim 1, wherein the method enables substantial real-time communication between the first user and the second user.

7. The computer-implemented method of claim 1, comprising:
determining, using the context data, that the identified gestures made by the first user further include non-signing gestures made by the first user;
when the non-signing gestures are made by the first user, rendering the avatar performing the non-signing gestures in a substantially similar manner to the first user; and
when the signed communications in the first sign language are made by the first user, rendering the avatar performing the translated signed communications in the second sign language.

8. A non-transitory computer-readable medium having program instructions embodied thereon that, when executed by at least one computing device, cause the at least one computing device to perform operations comprising:
receiving video of a first user of a video game;
processing the video to identify gestures made by the first user while the first user plays the video game;

receiving context data indicating actions occurring in the video game when the gestures are made by the first user;
determining, using the context data, whether the gestures made by the first user include signed communications in a first sign language;
in response to determining that the gestures made by the first user include signed communications in the first sign language, translating the signed communications in the first sign language into signed communications in a second sign language;
rendering an avatar of the first user performing the translated signed communications in the second sign language; and
presenting the avatar on a display for viewing by a second user.

9. The non-transitory computer-readable medium of claim 8, wherein the translating includes translating the signed communication in the first sign language into text in a first written language.

10. The non-transitory computer-readable medium of claim 9, wherein the translating further includes translating the text in the first written language into text in a second written language, and translating the text in the second written language into the signed communications in the second sign language.

11. The non-transitory computer-readable medium of claim 8, wherein the avatar is rendered in a virtual environment, and wherein presenting the avatar includes presenting a view of the virtual environment on the display.

12. The non-transitory computer-readable medium of claim 8, the operations comprising:
determining, using the context data, that the identified gestures made by the first user further include non-signing gestures made by the first user;
when the non-signing gestures are made by the first user, rendering the avatar performing the non-signing gestures in a substantially similar manner to the first user; and
when the signed communications in the first sign language are made by the first user, rendering the avatar performing the translated signed communications in the second sign language.

13. A system comprising at least one computing device, the at least one computing device having logic configured to implement operations comprising:
receiving video of a first user of a video game;
processing the video to identify gestures made by the first user while the first user plays the video game;
receiving context data indicating actions occurring in the video game when the gestures are made by the first user;
determining, using the context data, whether the gestures made by the first user include signed communications in a first sign language;
in response to determining that the gestures made by the first user include signed communications in the first sign language, translating the signed communications in the first sign language into signed communications in a second sign language;
rendering an avatar of the first user performing the translated signed communications in the second sign language; and
presenting the avatar on a display for viewing by a second user.

14. The system of claim 13, wherein the translating includes translating the signed communication in the first sign language into text in a first written language.

15. The system of claim 14, wherein the translating further includes translating the text in the first written language into text in a second written language, and translating the text in the second written language into the signed communications in the second sign language.

16. The system of claim 13, wherein the avatar is rendered in a virtual environment defined for gameplay of the video game.

17. The system of claim 13, the operations comprising:

determining, using the context data, that the identified gestures made by the first user further include non-signing gestures made by the first user;

when the non-signing gestures are made by the first user, th rendering the avatar performing the non-signing gestures in a substantially similar manner to the first user; and when the signed communications in the first sign language are made by the first user, rendering the avatar performing the translated signed communications in the second sign language.

18. The computer-implemented method of claim 1, wherein:

the context data indicates a gaze direction of the first user in a virtual environment of the video game when the gestures are made by the first user; and determining whether the gestures made by the first user include signed communication in the first sign language is based at least in part on the gaze direction of the first user in the virtual environment of the video game when the gestures are made by the first user.

19. The computer-implemented method of claim 1, wherein:

the context data indicates a proximity between the first user and the second user in a virtual environment of the video game when the gestures are made by the first user; and determining whether the gestures made by the first user include signed communication in the first sign language is based at least in part on the proximity between the first user and the second user in the virtual environment of the video game when the gestures are made by the first user.

20. The computer-implemented method of claim 1, wherein:

the context data indicates an intensity level of activity of the first user in a virtual environment of the video game when the gestures are made by the first user; and determining whether the gestures made by the first user include signed communication in the first sign language is based at least in part on the intensity level of activity of the first user in the virtual environment of the video game when the gestures are made by the first user.

* * * * *